Inventor
OLIVER OWEN PULLEY
By
Attorney

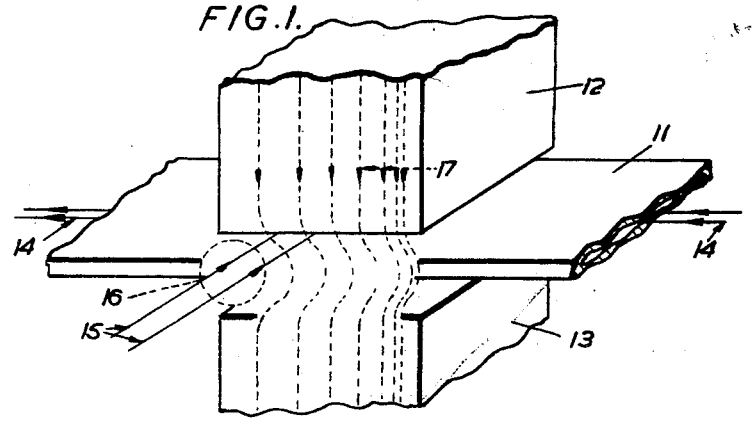
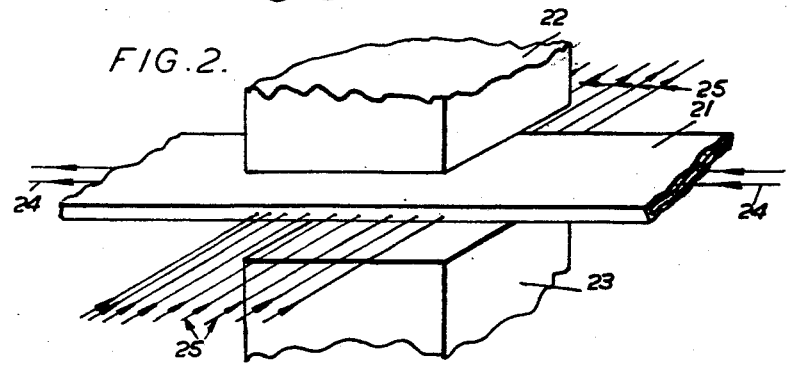
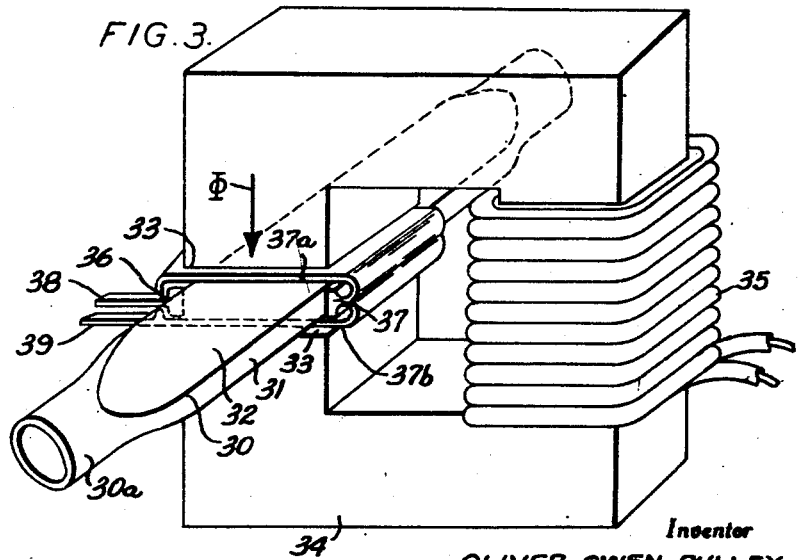

Inventor
OLIVER OWEN PULLEY
By
Attorney

Patented Aug. 17, 1954

2,686,474

UNITED STATES PATENT OFFICE 2,686,474

ELECTROMAGNETIC PUMP

Oliver Owen Pulley, Abingdon, England

Application July 31, 1951, Serial No. 239,459
Claims priority, application Great Britain
August 1, 1950

4 Claims. (Cl. 103—1)

This invention relates to electromagnetic pumps for electricity-conducting fluids such as liquid metals wherein the fluid is caused to flow along a duct in a gap in an iron circuit due to the interaction of mutually perpendicular components of flux or current in the fluid. Such pumps are referred to generally as electromagnetic interaction pumps.

It is convenient to classify the types of electromagnetic interaction pumps into two main classes, namely, conduction pumps and induction pumps. A conduction pump is characterised in having externally connected electrodes for feeding a current through the fluid in the duct while an induction pump is characterised in that there are no externally connected electrodes but the current in the fluid in the duct is induced therein by a changing magnetic flux. A conduction pump usually has the property of operating on either D. C. or A. C. but usually D. C. while an induction pump is essentially an A. C. device although a rotating D. C. magnet may of course be used as a substitute for a rotating polyphase field.

In a further sub-classification conduction pumps are divided into three sub-classes, namely, linear, spiral and annular. A linear conduction pump is characterised in that the fluid duct, which is usually rectangular in section, traverses the iron circuit in a linear manner. Examples of such pumps are provided by United States Patent 2,397,785 and United States Patent 2,386,369. A spiral conduction pump is characterised in that the fluid duct follows a spiral path, an example of such a pump being provided by British Patent 528,091. An annular conduction pump is characterised in that the fluid duct is annular in section and such a pump is referred to in the prior art discourse of British Patent 528,091.

This invention is concerned with the linear conduction sub-class of electromagnetic interaction pumps.

In a simple pump with field, current and fluid flow mutually perpendicular (as shown for example in Fig. 1 of United States Patent 2,386,369), the current increases the field in the gap toward the fluid entry and decreases it toward the outlet end. Moreover as the fluid velocity is increased there is progressive distortion of the current distribution from its uniform value at no flow, resulting in a concentration of current at the fluid outlet end and a reduction at the inlet end, and a consequent further distortion of the field distribution.

These effects have two consequences. Because the maximum local field is limited by the saturation value of the iron circuit and because of the additional condition that the mean field and applied current must be such that the field at the pump exit does not fall to zero there is a definite maximum pressure which can be produced by the pump. Also the maximum efficiency of conversion of electrical energy input to the conductor to hydrodynamical energy in the fluid is limited to 50%, occurring for large values of fluid velocity or more accurately for large values of the parameter, $$\frac{vl}{\sigma}$$

where $v$ is the fluid velocity
$l$ is the pump length and $\sigma$ is the resistivity of the fluid The invention overcomes or reduces these effects and so makes possible the generation of higher pressures and removes the above-mentioned limitation on the theoretical conversion efficiency.

The invention resides in a D. C. or single phase A. C. linear conduction electromagnetic interaction pump wherein the return conductor for the current traversing the fluid in the duct passes back through the gap in the iron circuit of the pump.

For the purpose of this invention the phrase "gap in the iron circuit" means that part of the flux circuit in which the flux traverses the fluid duct or ducts and includes the part occupied by an iron between two associated ducts.

In one form of the invention the gap is made of a size just to accommodate the duct and return conductor so that the conductor is in physical contact with the duct and one extremity of the gap.

In another form of the invention the gap in the iron circuit is made larger than that required to accommodate the duct and return conductor and laminations, stacked along the direction of fluid flow in the duct, are disposed between the duct and return conductor.

This latter form of the invention has particular application where the return conductor comprises an associated duct connected for series fluid flow with the first duct.

Embodiments of the invention as above stated and other features of the invention are now described with reference to the accompanying drawings in which:

Fig. 1 is a diagram showing flux distortion in a simple pump.

Fig. 2 is a diagram showing current distortion in a pump similar to that of Fig. 1.

Fig. 3 is a perspective diagrammatic view of one pump according to the invention.

Figure 4:
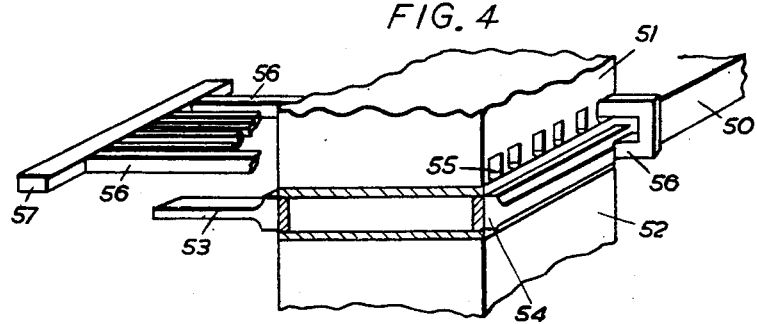
Fig. 4 shows a modification to the return conductor arrangement of Fig. 3.

In Fig. 1 a rectangular section duct 11 is located in a gap between pole pieces 12, 13 of an electromagnet. The direction of fluid flow along the channel is indicated by the arrows 14, the transverse current by the arrows 15, the flux due to that current by the dotted line 16 and the flux through the pole pieces by dotted lines 17. The flux is concentrated at the inlet end of the duct 11 due to the interaction of flux lines 16 and 17.

In Fig. 2 a rectangular section duct 21 is located in a gap between pole pieces 22, 23 of an electromagnet. The direction of fluid flow along the channel is indicated by the arrows 24 and the distribution of the transverse current is indicated by arrow 25. The current is concentrated at the outlet end of the duct 21. This may be accounted for by the fact that with a concentrated flux at the inlet end (similar to that shown in Fig. 1) the back E. M. F. generated in the fluid in the duct cutting that flux is larged. The current at the inlet end, with rapid fluid flow, may even be negative.

In Fig. 3 the pump has a rectangular duct 30 formed as a flattened portion of the stainless steel tube 30a so as to have narrow side walls 31 and wide side walls 32. The duct 30 is situated between the pole faces 33 of an electromagnet 34 having an energizing winding 35, so that a flux can be set up in the direction of the arrow Φ to traverse the duct 30. Electrical connections to the duct comprise an electrode 36 brazed to one wall 31 and an electrode 37 brazed to the other wall 31 of the duct 30. A connection is made to electrode 36 by connector 38 and a connection is made to electrode 37 by sheet conductors 37a, 37b joined to a common connector 39. In operation of the pump with liquid metal in the duct 30 current passes through the liquid metal from electrode 36 to electrode 37. This current interacts with the flux passing at right angles to the current so that a pressure is set up in the liquid metal at right angles to both the current and the flux; that is, the liquid metal is caused to flow along the duct 30. The current that has passed across the duct 30 is returned by way of sheet conductors 37a and 37b so there is no net current in the gap and consequently no flux due to that current. The field in all points across the gap remains uniform and equal to the impressed field.

In Fig. 4 the duct 50 between pole pieces 51, 52 is fed with current transversely by connectors 53, 54. A return current path from connector 54 is provided through slots 55 in pole piece 51 by conductors such as conductor 56. These conductors may be brazed on to a common connector such as connector 57.

Figure 5:
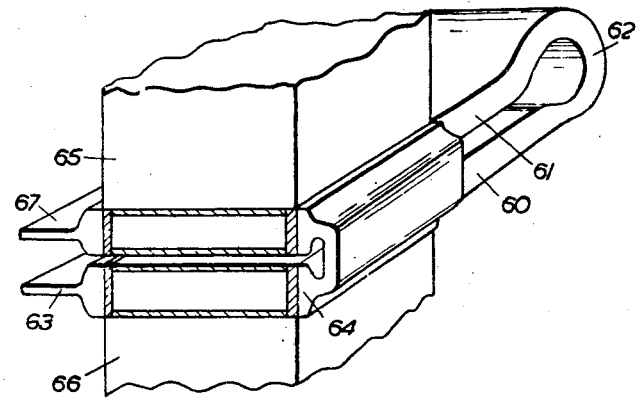
Fig. 5 shows a modification to the conductor and duct arrangement of Fig. 3.

In Fig. 5 two associated ducts 60, 61 are provided and connected via loop 62 so as to provide a series flow path for the fluid. The current enters duct 60 by connector 63, passes transversely across the duct, through interconnector 64 and back through the gap between pole pieces 65, 66 by duct 61 and connector 67. Loop 62 is of a length such that negligible leakage current flows through it.

Figure 6:
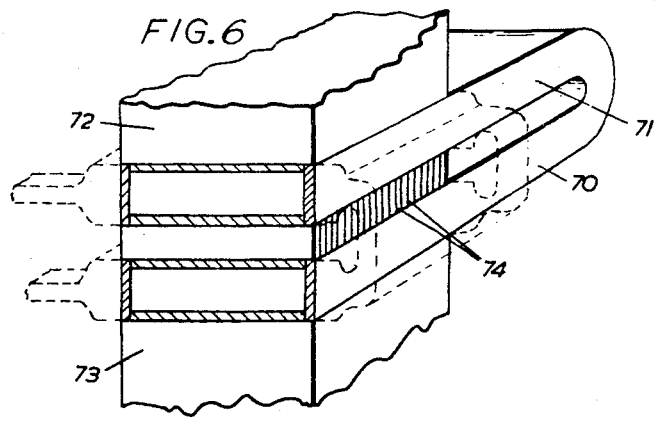
Fig. 6 shows a further modification to the conductor and duct arrangement of Fig. 3.
Figure 7:
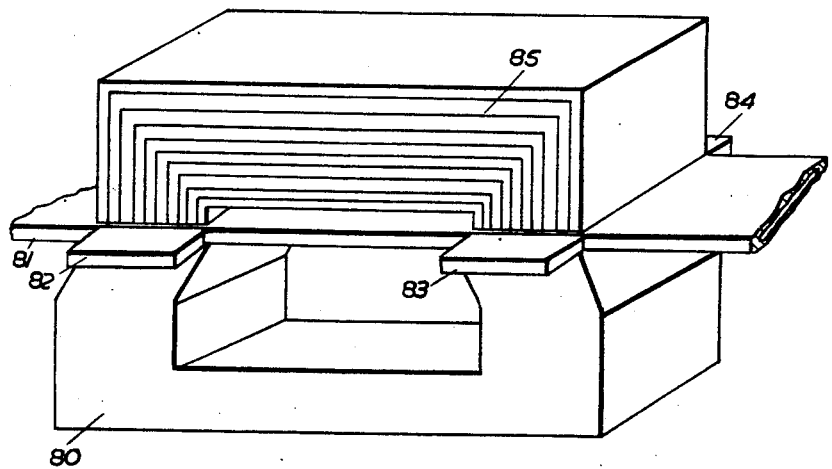
Fig. 7 is a perspective diagrammatic view of a two stage rectilinear pump according to the invention.

In Fig. 6 the associated ducts 70, 71 are separated where they pass between pole pieces 72, 73 and the space between them is filled with laminated members 74 to increase the reluctance to a flux set up by a transverse current through the ducts whilst not substantially affecting the reluctance of the main flux path between the pole pieces. As there can be no appreciable flux transverse to the laminated portion of the iron circuit there is no appreciable transverse flux in the remainder of the magnetic circuit and hence no distorting field in the gaps. By spacing the ducts 70, 71 a better flow path for the fluid is obtained in so far as sharp bends are avoided. By increasing the spacing even further than shown in Fig. 6 the curvature given to the flow path can be minimised until the extreme case is reached as shown in Fig. 7. In this figure the gap in the iron circuit is very large and consequently the two stages of pumping may be carried out rectilinearly. The iron circuit consists of yoke 80, the duct 81 carries the electrical conducting fluid, electrical connector 82, 83 are provided for current connection and interconnection 84 completes the current path between the two stages of the pump. A laminated section 85 together with the duct 81 fill the gap in the iron circuit. The length of duct between connectors 82 and 83 must be made long enough to reduce current leakage in a direction along the duct 81 to a tolerable minimum.

Figure 8:
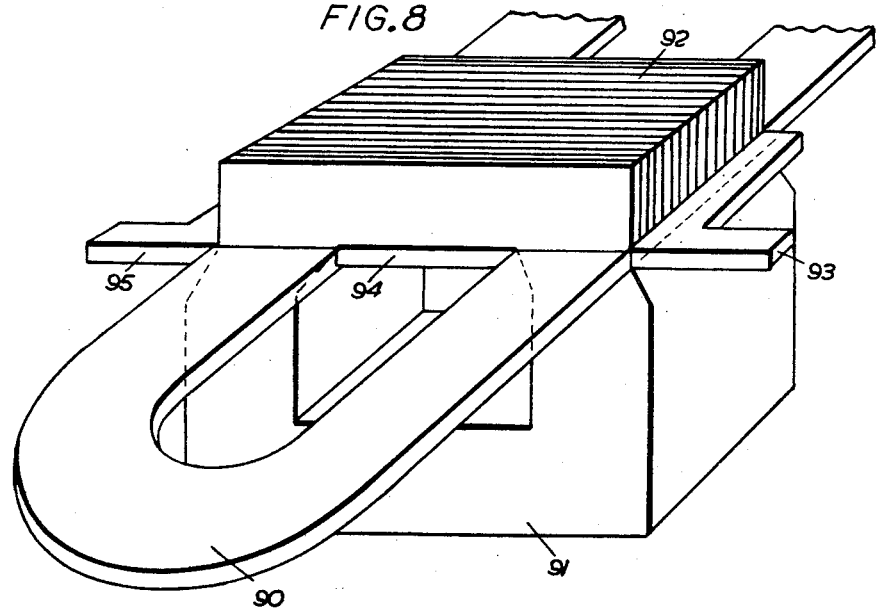
Fig. 8 is a perspective diagrammatic view of another form of two-stage pump according to the invention.

In Fig. 8, the current path is made rectilinear and the fluid flow path is looped. The U-shaped duct 90 is located between a yoke 91 and lamination 92. Current connections 93, 94, 95 are provided.

I claim:

1. A D. C. or single phase A. C. linear conduction electromagnetic interaction pump comprising, an iron yoke presenting two pole faces, means for setting up a flux in the yoke to cross the gap between the pole faces, a duct in the gap arranged to be traversed by the flux in one direction and having electrodes for the passage of current in a direction across the duct and angularly with respect to the flux, and an electrical conductor connected to one of said electrodes and shaped to pass through the gap between the pole faces in a direction opposite to that taken by the current across the duct.

2. A D. C. or single phase A. C. linear conduction electromagnetic interaction pump comprising, an iron yoke presenting two flat pole faces, means for setting up a flux in the yoke to cross the gap between the pole faces, two adjacent parallel rectangular-section ducts in said gap arranged so that their broad faces are in parallel planes together with the flat pole faces, electrodes for the passage of current across fluid in ducts, an electrical connector joining together the two electrodes on one side of the gap and separate connectors to the electrodes on the other side of the gap.

3. A D. C. or single phase A. C. linear conduction electromagnetic interaction pump comprising, an iron yoke presenting two flat pole faces, means for setting up a flux in the yoke to cross the gap between the pole faces, two spaced parallel rectangular section ducts in said gap separated from each other by laminations stacked along the direction of fluid flow in the duct and arranged so that the broad faces of the ducts are in parallel planes together with the flat pole faces, an electrical conductor joining electrodes in the narrow faces of the ducts on the one side and separate connectors to electrodes in the narrow faces of the ducts on the other side.

4. A D. C. or single phase A. C. linear conduction electromagnetic interaction pump comprising, an iron yoke presenting two flat pole faces, a flat rectangular section duct passing in turn over said pole faces and in the plane of the pole faces, electrodes associated with said duct for feeding current across the duct at one pole face and back across the duct at the other pole face and a laminated iron assembly completing a flux path for flux in said core, the lamination being stacked for minimum reluctance in a path round the yoke and for maximum reluctance in a direction of fluid flow along the duct.

References Cited in the file of this patent

UNITED STATES PATENTS

| Number | Name | Date |
|---|---|---|
| 1,298,664 | Chubb | Apr. 1, 1919 |
| 1,660,407 | Bainbridge | Feb. 28, 1928 |
| 1,792,449 | Spencer | Feb. 10, 1931 |
| 2,386,369 | Thompson | Oct. 9, 1945 |
| 2,389,218 | Tama et al. | Nov. 20, 1945 |
| 2,397,785 | Friedlander | Apr. 2, 1946 |
| 2,539,800 | Tama | Jan. 30, 1951 |

FOREIGN PATENTS

| Number | Country | Date |
|---|---|---|
| 511,137 | Germany | June 20, 1928 |